United States Patent [19]

Sosnowski et al.

[11] 4,454,427

[45] Jun. 12, 1984

[54] INCINERATOR AND FUME SEPARATOR SYSTEM AND APPARATUS

[76] Inventors: Leon Sosnowski; Thaine Mathewson, both of 62 Wegman St., Auburn, N.Y. 13021

[21] Appl. No.: 320,114

[22] Filed: Nov. 10, 1981
(Under 37 CFR 1.47)

[51] Int. Cl.³ .............................................. F01N 3/04
[52] U.S. Cl. ............................................. 290/2; 290/52
[58] Field of Search ................. 290/2, 52; 55/20; 110/345; 422/169, 171, 172, 176

[56] References Cited

U.S. PATENT DOCUMENTS

| | | | |
|---|---|---|---|
| 3,223,860 | 12/1965 | Brill | 290/2 X |
| 3,488,960 | 1/1970 | Kirkpatrick | 290/2 X |
| 3,795,486 | 3/1974 | Ekman | 422/171 |
| 3,948,608 | 4/1976 | Weir, Jr. | 422/169 |
| 3,966,418 | 6/1976 | Frevel et al. | 422/176 |
| 4,021,202 | 5/1977 | Field et al. | 422/172 |
| 4,201,555 | 5/1980 | Tkach | 55/20 |
| 4,256,045 | 3/1981 | Johnson, Jr. | 110/345 |

OTHER PUBLICATIONS

"The 1978 Energy Guidebook" Published 1978 by McGraw-Hill.

*Primary Examiner*—G. Z. Rubinson
*Assistant Examiner*—W. E. Duncanson, Jr.
*Attorney, Agent, or Firm*—Bradford E. Kile

[57] ABSTRACT

The present invention provides an incinerator and fume separator device and a method for burning such materials as refuse, tire chips and sewage sludge or combinations thereof as well as other combustible materials to generate steam to supply steam heat and/or electricity to towns, villages or individual establishments. One of the key features of the system is the use of a horizontal conduit, wherein gases are initially cooled by a water-cooled conduit, part of the particulate material being removed within this tubing by use of baffles and fly ash settling chambers. The gases proceed through this conduit at a relatively high velocity and then through various fume separators located along the conduit by which the gases are intimately mixed with a liquid alkaline solution, such as lime water, by the propelling action of a ribbed slinger or propellor type device, located within the separator which because of its high speed and shearing action produces a cyclonic effect, thereby insuring intimate contact between the acidic contaminants in the gas and the fine droplets of alkaline material. Located underneath the ribbed slinger is a backwardly curved fan to pull the gas-alkaline liquid mixture downward and insure an even more intimate mixing of the contaminated gases and alkaline liquid. The purified gases are then exhausted into the atmosphere. According to the present invention, a variety of trash materials can be incinerated to generate steam and the exhaust gases can be effectively purified.

33 Claims, 6 Drawing Figures

INCINERATOR AND FUME SEPARATOR SYSTEM AND APPARATUS

BACKGROUND OF THE INVENTION

The invention relates to an incinerator and fume separator for efficiently burning various types of materials, such as trash, sewage sludge, shredded scrap tires, coal, etc., at temperatures up to about 1800° F., while removing about 90% of all deleterious gases, such as $SO_2$, $NO_2$ and particulates so as to avoid pollution of the atmosphere by the gases exhausted from the incinerator. The unusual mechanism by which the pollutants are removed from the waste gas to produce a virtually clean exhaust gas is achieved by means of the special fume separator system employed herein in tandem with other mechanisms for removing the particulate materials, which fume separating device, etc., will be subsequently described. The heat produced from such incineration will be used to generate steam to heat various public buildings, hospitals, nursing homes, etc. at the rate of 20,000 to 500,000 pounds of steam per hour and serve populations in towns or cities of 25,000 to 100,000 people. Alternately, the steam produced can be used to drive a steam generator for producing electrical power to air condition said establishments.

During this time of rapidly diminishing fuel sources and the skyrocketing cost of heating homes and generating electricity by the conventional oil powered systems, a great amount of research and technology has been invested in searching for alternative and economically feasible fuel substitutes for the expensive petroleum based fuel sources. Among the most important avenues of research are those which have concentrated upon the use of various waste materials, particularly trash, sewage sludge and other materials having combustible potential or calorific value. The discovery of a system or apparatus capable of efficiently burning trash would serve the various objectives of (1) using these waste products as a source of energy; (2) efficiently disposing of these waste products; and (3) reducing land fill problems; thereby serving to clean up the environment.

While attempts have been made to incinerate sewage sludge and trash in an effort to generate steam heat and/or electricity, these attempts have not been altogether successful in that it has been difficult to satisfy the rather stringent environmental regulations set by the E.P.A. This is especially true when the raw products of combustion have a high sulfur and/or nitrogen content and especially plastic materials composed of chlorinated hydrocarbons which generate hydrochloric acid upon entering the atmosphere.

To counteract the problems involved in burning the aforementioned contaminated materials, efforts have been made to neutralize the gaseous products with alkaline materials. Thus, such means as wet scrubbers have been employed in which the alkaline material is cascaded over a series of packing materials in a vertical chamber so that the alkaline material is countercurrent to the upward flow of the contaminated gas. While this has been effective in purifying exhaust or stacked gases of a low to average acid content, the prior art systems have not been satisfactory for burning materials capable of generating high concentration of acids, such as scrap tires, certain sludge materials and, of course, coal which has a high sulfur content.

OBJECTS OF THE INVENTION

It is an object of the present invention to provide a method for producing steam for heating public buildings, nursing homes or other establishments by using a variety of combustible materials, such as trash, sewage sludge and/or coal in an efficient manner.

It is another object of the present invention to incinerate waste materials, particularly waste materials containing a certain percentage of tire scraps therein, at temperatures about 80% hotter than most trash burning systems to generate steam heat or electricity.

It is still a further object of the present invention to eliminate over 98% of all acids and particulates produced by waste materials containing a high nitrogen, chlorine and/or sulfur content by use of the fume separators of the present invention.

It is a further object to provide an incinerator and fume separator apparatus capable of efficiently burning a variety of trash or high acid producing materials both efficiently and with a minimum of air pollution and at a cost heretofore thought to be impossible.

Finally, it is an object of the present invention to provide a fume separator which makes it possible to intimately mix an alkaline material with acidic waste fumes so as to prevent the waste gases from raining acidic materials into the atmosphere.

BRIEF DESCRIPTION OF THE DRAWINGS

These and other objects of the invention will become apparent from the following specification, taken together with the accompanying drawings, in which.

SUMMARY OF THE INVENTION

Figure 1:
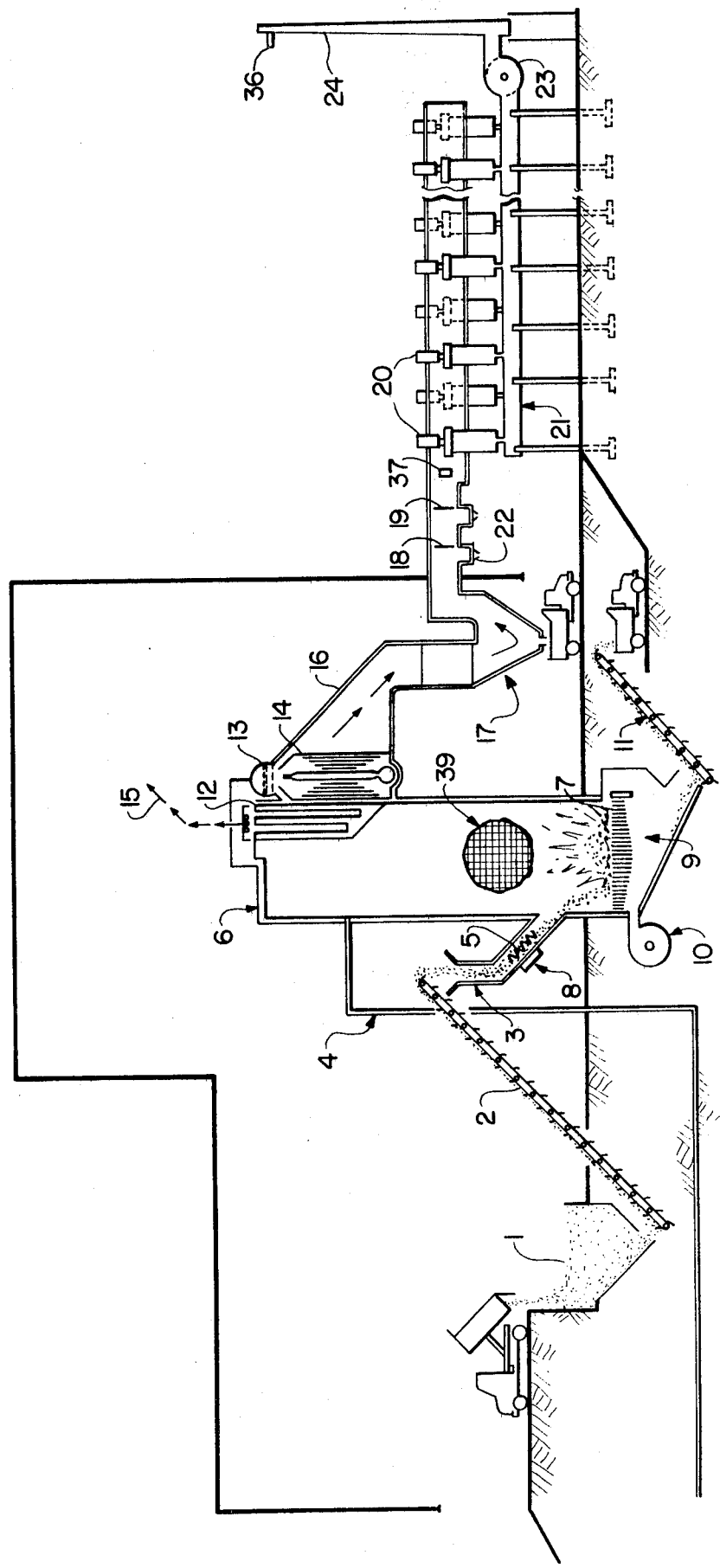
FIG. 1 is an apparatus depicting the entire steam generating system for carrying out the present invention.

The present invention relates to a refuse firing furnace and steam generation system. According to the invention, refuse or waste material is fed into an incinerator or refuse burning furnace where it is ignited and burned at temperatures up to about 1800° F. The heat from this burning operation is used to heat water in a superheater drum consisting of boiler tubes to generate steam for heating buildings or generating electricity. The contaminated gases are then purified by passing the gases through an economizer and into a water-cooled horizontal conduit system, wherein the gases are initially cooled by, e.g., a water-cooled steel tubing; part of the particulate material in the gas is initially removed by steel baffles, where the larger sized particulate material is initially collected in fly ash settling chambers; the gas is then drawn at a high velocity through the flue tubing where the acidic gases are neutralized and the remaining particulate materials are removed by means of the various fume separators as depicted in the drawings.

In respect to purifying the gases, the heart of the present invention resides in the fume separators by which the gases are intimately mixed with a liquid alkaline solution, such as lime water, and the mixing is effected by the propelling action of a "ribbed slinger," which because of its high speed shearing action produces a swirling or cyclonic effect, thereby insuring intimate contact between the contaminated gas, i.e., such as $SO_2$-containing gas, and the fine droplets of alkaline material. In addition to the neutralization of the acidic forming gases, the fume separator removes the gas contaminates by means of impaction, interception and diffusion as will be subsequently described. Underneath the propeller or the "ribbed slinger" is a centrifugal fan having backward curved blades which serve both to produce a venturi effect and to prolong the contact time within the fume separator flow path and achieve greater purification of the exhaust gases.

The purified gas then passes through an exhaust stack in a clean state, such as to satisfy all EPA requirements, as they now exist, for many years to come.

DETAILED DESCRIPTION OF THE INVENTION

The method of producing steam and/or hot water, particularly by burning municipal refuse without substantially contaminating the atmosphere will be described. Initially, it must be pointed out that Applicants visualize this system as being used in a municipal town or village and recommend that such municipality, etc., implement a source sizing system for collecting the household trash so it can be collected in a compactor type truck. This will remove large items, such as stoves, refrigerators, so that they need not be sorted. The compactor trucks can then go directly to the steam plant and unload the refuse directly into the storage hopper without the necessity of sorting and shredding the refuse. Of course, the largest expense, both in equipment costs and in time, is in the sorting and shredding of refuse before burning.

Before discussing the various apparatus means for carrying out the present invention, it must be emphasized that only the essential components have been shown for the sake of clarity, and certain pumps, temperature sensors, water supply inlets, etc. have been eliminated from the drawings in some instances.

Turning to FIG. 1 of the drawings, a means of utilizing municipal refuse for firing steam plants and the fume separator for cleaning the contaminated gas is illustrated therein. Thus, the trucks loaded with trash, dump the refuse in the refuse storage hopper 1, which refuse or trash is preferably mixed with at least 15% of shredded tire chips to increase the burning capacity thereof. The mixture is then conveyed by conveyor belt 2 into the double-walled feed hopper 3 wherein it is funneled onto the grate 7 in furnace 6 and burned at temperatures up to about 1800° F. Underneath the grate is a fan 10 which forces air and/or oxygen into the lower part of the grate, thus insuring complete combustion of the combustible materials in the trash. On the other hand, sewer sludge may be introduced through pipe 4 wherein it is introduced into the upper portion of the furnace, and there contacts the furnace atmosphere at a temperature of about 1200° F., such that by the time the sludge reaches the hottest portion of the furnace, i.e., the burning refuse on the grate, it is dehydrated to about 40% by weight of water, which greatly increases the calorific value and insures the complete combustion of the sewage sludge so that it produces a sterile ash. The proportions of the sewage sludge, tire chips and trash components can be controlled by a computerized mixing process and its computer backup system (not shown) so as to optimize the burning capacity of the mixture. Applicants have discovered that when the flow of tire chips is at least 15%, the trash 84% and the sludge powder, i.e., the dehydrated sludge about 1%, excellent burning results are achieved. The addition of the tire chips to the typical municipal refuse increases the heat-producing capacity of the trash by about twofold.

The heat produced from the burning trash heats up the superheater, drum and boiler tube assembly designated 12, 13 and 14, respectively, in the drawings and produces steam through steam exit 15 which is used to heat buildings and/or generate electricity. It should be emphasized that the refuse burning furnace 6 has a water-cooled or double-walled construction in which water is circulated through the double walled construction for its cooling and heat-transfer effect and the inside of the furnace is preferably lined with a refractory material such as refractory bricks 39 partially shown in FIG. I. As shown in the drawing, the double-walled construction of the furnace 6 contains water circulating therethrough and this preheated water is supplied to the super-heater or steam generating pipes so that it serves the dual purpose of cooling the walls of the furnace and at the same time generating steam to be passed through steam exit 15.

Before proceeding to the gas purifying system, a few other features of the incineration and steam generation portion of the system should be described. Thus, the grate 7 may be a moveable grate (moved by a motor or other means not shown) so that the ashes can be released into the ash pit 9, where they are cooled and conveyed by conveyor 11 into a dump truck, where the ashes with such materials as ferrous metals, glass, aluminum are removed and carried away and disposed in a suitable land filing operation, and/or used for water drainage fill or as building material or storage in landfill for later use as a salable by-product.

In respect to the feed hopper 3, this is water-cooled to by-pass water between the walls of the double-walled construction to prevent premature melting of materials, such as plastics, etc., which may otherwise melt and clog up the throat of the hopper feeding device. This melting of plastics produces a so-called "bridging" or clogging effect. To further minimize the possibility of such a clogging operation, a special screw drive 5 or auger may be used to force the material down the throat of the hopper 3. This auger is preferably located at the lower portion of the hopper feed 3, where clogging is more apt to occur although it can be located at the top thereof. Of course, more than one refuse storage hopper or feed hopper system may be employed.

The auger 5 is a screw conveyor which propels the trash down the hopper and is also preferably water-cooled to prevent premature heating of the materials. This auger is of a conventional structure usually having a central shaft containing spiral blades radiating from the center of the shaft so as to propel objects in this case in a downward direction towards entrance into the furnace as the auger is rotated.

In certain cases, wire and other components may get caught up in the auger device and, therefore, an access door 8 may be supplied, which permits an operator to unclog the hopper shoot periodically. Of course, one or more access doors may be used. This door may be a sliding door or a hinged door. At any rate, the existence of more than one feed hopper or refuse storage hopper will insure continuous operation of the furnace during the periods when one of the shoots, i.e., feed hoppers, may be clogged up.

The auger means is an optional component and in some cases may not be desirable, although it is generally a preferred embodiment of the present invention.

The chief problem in these trash or waste burning systems is the elimination of the contamination from the gas, particularly the acid-producing substances as well as the soot or particulate materials in the exhaust gases. It is a particular feature of the present invention to be able to burn the trash effectively and to produce a virtually clean exhaust gas with the odors, pollutants and approximately all of the ash particles removed. This is accomplished by the particular method and apparatus of the present invention as depicted in the various figures of the drawings.

Looking at FIG. 1, the exhaust gases pass through an exhaust flue 16 into an enconomizer 17, which economizer is water-cooled bringing the temperature down to between about 350°-550° F., although this, of course, depends upon the initial temperature of the gas. The construction of such economizers are well known in the art and such a device is known to cool the gases and precipitate or generally eliminate the majority of the soot or ash particles. The gas is then passed to the stainless steel horizontal conduit 19 as depicted in FIG. 1, wherein the gas contacts various baffles 18, particularly steel baffles, wherein more of the particles are removed in the fly ash settling chambers designated 22 in the drawing. This removes still more of the larger or intermediate fly ash particles. The large soot particles from the economizer and fly ash settling chambers may be removed through trap doors or other means (not shown in detail) located at the bottom of the economizer and fly ash settling chambers as shown in FIG. 1.

The exhaust gases then travel through the stainless steel horizontal conduit 19 at relatively high speeds, i.e., a high rate of velocity, which in a typical case may be about 40,000 CFM, where the gases pass through a series of fume separators 20 which are spaced apart along the length of the steel tubing at relatively close intervals and are preferably alternately located on both sides of the steel separator to insure a gas flow which proceeds uniformly throughout the horizontal conduit 19 and also to insure complete purification of the exhaust gases.

As previously pointed out, the heart of the present purification system in respect to removing the acidic producing components and smaller particulates resides in the fume separator arrangement of the present invention. Looking at FIG. 3 of the drawings, according to this arrangement, the fume separators are removably connected at space locations on both sides of the flue conduit 19 through exhaust gas inlets 27 which inlets are preferably tangential gas inlets to enhance the cyclonic flow. On the other hand, an alkaline chemical wash, such as lime water in the vessel 38, is introduced through line 34 into the liquid inlet pipes 28 of the fume separators, where it is intimately mixed with the contaminated flue gas. This intimate mixture is achieved by the rotation of the shaft 33 in the fume separator powered by known means, such as a motor, which turns the ribbed slinger 25 and the centrifugal fan 26 at a high rotational velocity, such that the incoming alkaline solution, e.g., lime water is intimately mixed with the flue gas by the propelling action of the "ribbed slinger," which because of its high speed and shearing action in tandem with the rotating fan produces a whirling or cyclonic effect, thereby insuring intimate confact between the contaminated gases, i.e., acidic producing gases, and the fine droplets of alkaline material produced by the spraying action resulting from the rotation of the ribbed slinger. Such intimate droplets of alkaline solution insures complete reaction with the acidic materials in the gas due to the increased area of contact between the flue gas and the tiny droplets of alkaline material.

Figure 4:
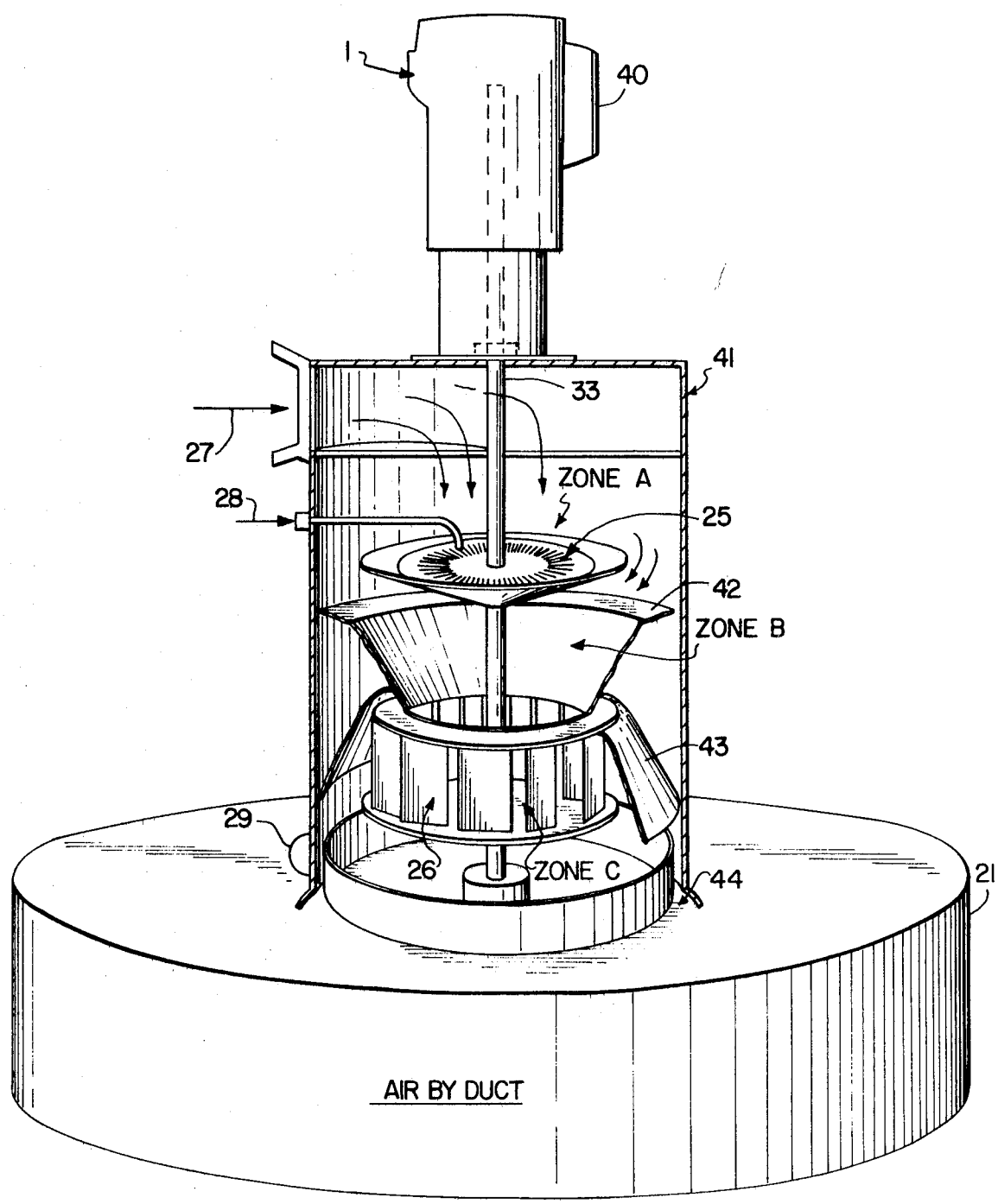
FIG. 4 is a detailed view of the fume separators of the present invention.

The structure of the fume separator system is shown in detail in FIG. 4. In the drawing, a shaft 23, turned by a motor 40 is approximately centrally disposed in the fume separator container 41. A ribbed slinger 25 is a centrifugal fan 26 and connected at approximately the centers thereof to the shaft 33 with the fan located beneath the ribbed slinger 25. A conical shaped device or structure 42 is located underneath the ribbed slinger with the larger portion of the cone attached to the walls of the fume separator container at the upper portion thereof with the smaller portion of the cone leading into the center of the fan 26 so as to form a venturi cone when the shaft is rotated at high velocity and the mixture of alkaline liquid and exhaust gas fumes are drawn into the center of the fan to separate the gas from the liquid. A baffle 43 (or inverted cone) attached to the conical device 42 and surrounding the fan 26 is directed towards the walls of the container so that the liquid is sprayed by the fan into the baffle, onto the walls of the container and into the trough 44 where the liquid with captured fumes are removed through drain exit 29. The baffles completely surround the fan and can be attached to the walls of the container in the vicinity of the trough portion. On the other hand, the purified gases leave through the gas exit located at the center of the fume separator and into the air or gas discharge duct 21.

According to FIG. 4, the workings of the fume separator are such as to divide the three separation zones designated A, B and C.

Zone A shows the gas is a gas and liquid contact zone wherein the contaminated gas fumes enter the fume separator at exhaust gas inlet 27 wherein the fumes are pulled downward into a cyclonic flow by the combined high velocity rotation of the ribbed slinger and fan. The alkaline liquid introduced through liquid inlet 28 flows onto the ribbed slinger which is a cup-shaped or bowl-shaped disc with protruding ribs located at the interior of the disc. The high shearing action of the slinger due to the ribbed formations and high rotation of the disc propels the alkaline liquid at a direction perpendicular to the cyclonic flow of the gas fumes when the liquid is broken up into fine droplets wherein it is intimately mixed with the exhaust gases as contact between the fume material and liquid occurs. Removal mechanisms in this case are by impaction and interception which will be subsequently discussed.

Meanwhile, the gases are drawn downward through the fume separator by the action of the centrifugal fan 26. This causes a venturi effect because the gas is pulled downward in the restricted area between the outer periphery of the ribbed slinger and the walls of the fume separator into a conical section located underneath so as to form a Venturi zone B.

In the Venturi zone designated B in FIG. 4, the velocity of the mixed fume and alkaline droplets is about doubled forcing more intimate contact and scrubbing action. A relative velocity difference (the gas speeds up more than the alkaline solution and fume particles) provides additional capture of gaseous and particulate contaminates. The venturi cone also further enhances the cyclonic, whirling type flow. Removal mechanisms in this zone are by impaction, interception and additionally by diffusion, which will also be discussed.

Figure 2:
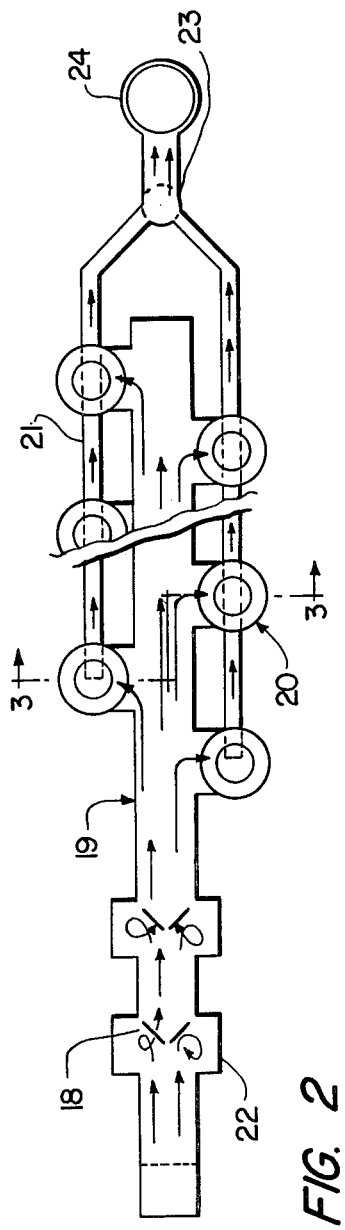
FIG. 2 is a schematic plan view of the steel flue pipe and fume separators of FIG. 1 to show the flow path of the exhaust gases.

Zone C of FIG. 4 is where much of the separation takes place in which the centrifugal fan (with the blades curved in a direction opposite to the rotation of the blades or curved in the opposite direction of an ordinary fan) provides a rugged flow path from the center of the fan through the blades, forcing the remaining fumes to be captured by the alkaline flow. The liquid and captured particulate material flow down the walls of the conical shaped baffle 43 into a trough-like drain-off area 44 and into drain outlet pipe 29, where it is recycled back to the alkaline chemical wash vessel 38. The clean gas is then allowed to pass out the center of the bottom section into the gas or air discharge ducts 21 (shown in FIG. 2), where the gases are pulled by the induction fan 23 into the stack 24 and the virtually clean gas is passed into the atmosphere.

Figure 3:
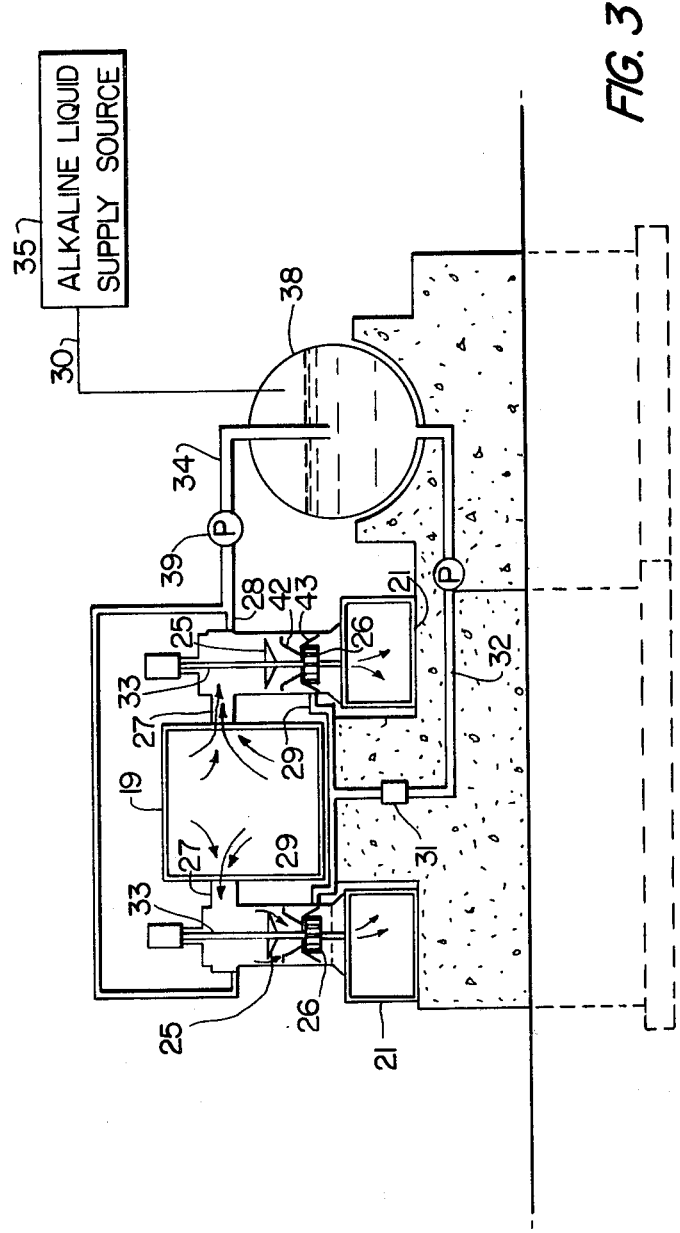
FIG. 3 is a cross-sectional view along 2—2 of FIG. 1, which also shows the alkaline material introduced into the fume separators located along a horizontal flue tube.

As shown in FIG. 3, the alkaline material from the alkaline liquid supply source 35 is dispensed by line 30 into the alkaline wash-containing vessel 38, wherein it is pumped by pump 39 into the fume separator through line 34 into the inlet 28 to purify the exhaust gases. The liquid is then recycled from the drain outlet 29 at the bottom of the fume separator through the line 32 back into the vessel 38. The liquid exiting from the bottom of the fume separators through the drain pipe 29 exits through line 32 and may be filtered through one or more filters 31, such as ceramic filter, to remove particulate materials before returning to the alkaline bath. The line 32 may be split into several lines by means of T-shaped connections so that one or more filters may be used in parallel, with valves preceding each filter in the event that one or more filters gets clogged and in which case the valve is shut off in front of the clogged filter permitting the recycled liquid to pass freely through the unclogged filters, while the clogged filter is being replaced. Thus, the filter 31 may be connected to the pipe 32 by a screwing means or a simple plug-in means known to the art to facilitate easy removal thereof.

The alkaline chemical wash may be any known alkaline material, such as an aqueous solution of lime, limestone, soda ash, or mixtures thereof.

In a typical situation of burning tire chips containing high amounts of sulfur dioxide, when $Ca(OH)_2$ is used, it reacts with the sulfur dioxide to ultimately produce gypsum, i.e., $CaSO_4 \cdot 2H_2O$ as a salable by-product in conjunction with the ferrous metals, glass, aluminum and sterile ash previously mentioned, which may be used for water drain fill material. The alkaline material may be pre-mixed at varying concentrations by mixing, e.g., hydrated lime of 100–300 mesh agitated in a tank of water by agitation means and heated by steam and/or steam coils and passed through line 30 into the vessel 38. The concentration of the alkaline material may be controlled in response to a gas analyzer probe 36 located in the stack 24. In such a situation, as the amount of contaminates is increased in the stack 24, the concentration of the alkaline material in the aqueous solution is increased and/or the amount of alkaline wash pumped into the fume separator is increased in response to the increased contaminants by known actuating means. In a similar manner, an electronic fume tester can be inserted into the steel horizontal tube and the concentration and/or amount of alkaline material entering the various fume separators may be controlled in response to the acid producing content, i.e., such as sulfur dioxide or nitrogen oxide gases in the exhaust gases by known actuating means.

The various fume separators may be coated with an acid and/or alkaline resistant resin, such as an epoxy resin, to coat the entire inner portion of the fume separator including the ribbed slinger, fan, etc., to prevent scale build-up within the fume separators. The capacity of such fume separators is approximately 5,000 CFM each and the rapid flow of the gas is caused by the combination of the venturi effect produced by the various fume separators in tandem with the pull of the induction fan 23. As pointed out previously, the various fume separators work by a combination of impaction, interception and diffusion.

Impaction operates generally on particles sized greater than $3\mu$. Impaction occurs when the momentum of the particle prevents it from avoiding a collision with an object, because the particle momentum is greater than the streamlined attraction to go around the object. This mechanism then works mostly with larger particles, and is the predominant mechanism of removal. This phenomenon occurs in zone A of the fume separator when the flue gases containing the particulate materials are contacted with the tiny droplets of alkaline material produced by the movement of the ribbed slinger. A similar phenomenon occurs in the Venturi zone B.

In respect to the phenomenon of interception, this occurs in zones A, B and C of the fume separator. Interception may be described as an adsorbing mechanism and occurs when a smaller particle, generally between 1 and $3\mu$, in following the streamline around an object comes close enough, generally within $\frac{1}{2}$ of a micron, to be adsorbed at the surface of the collection medium. In such a case, the smaller particulate particles are adsorbed on the collection medium, viz. the alkaline droplets, and removed from the gaseous material.

The mechanism of diffusion or Brownian movement, causes particles to be adsorbed or absorbed because of the random side to side movement caused by particles colliding with gas molecules. This mechanism functions on particles sized less than $\frac{1}{2}$ micron. Thus, according to the present invention the smallest particles are adsorbed on the liquid droplets by diffusion in the separation zone C of the fume separator, which represents the heart of the separation zones. Zones A, B and C, thus represent the fume separator flow path of the gaseous and liquid mixture through the separator.

In respect to the specific embodiments, as illustrated in the drawings, it must be emphasized that while the horizontal conduit 19 in FIG. 1 is shown as a cylindrical structure, any shape can be used. Indeed, it may be preferable to use a rectangular shaped conduit as the conduit 19 for ease of attachment of the fume separators onto the conduit. In this connection, although a steel tubing, a steel baffles, etc., are represented therein, the apparatus can be made of any suitable construction able to bear the normally high acidic exhaust gases which pass through and the abrasive effect of the particulate materials. Thus, the steel tube itself may be plated with another metal or coated with a material on the interior thereof which plated metal or coating has optimum resistance to corrosion. Or for that matter, a metal other than steel may be used alone or plated on the interior therein with another metal or coated with an essentially acidic resistant material. Also, it must be emphasized that the horizontal conduit tube 19 is water-cooled to cool the incoming gases either by using a double walled metal or by a water jacket conventionally used in the art.

In respect to the incinerator itself, when burning trash up to 500 tons or thereabouts, a fluidized bed may be used. Such fluidized bed is well known in the art and consists of a bed of particles and fuel kept in suspension by combusion air admitted through the grate-like distributor. Such fluidized bed can be used when smaller amounts of trash are burned and, of course, the advantage of using this type of system is to insure complete oxidation of the particles by contacting air or oxygen more intimately with the trash or waste particles. In such a fluidized bed, water tubes may be circulated through the bed as a heat exchange means and the steam produced therefrom can be connected to the superheater, drum and boiler tube apparatus shown in FIG. 1; the steam ultimately passing through steam exit 15 to be used to heat homes or to generate electricity.

In cases where large amounts of trash are burned, i.e., 500 tons and above, a fluidized bed is not used; the waste materials may be simply situated on stoker beds which move around and shake like typical grates as depicted in the drawing. Further, although a forced air draft fan is shown in the drawings, i.e., FIG. 1, other means of introducing the air can be used, such as by air jets located under the grate or situated in such a way as to produce a type of cyclonic effect so as to insure greater oxidation of the refuse. When a fan is employed, variable speed fans are preferably used to achieve proper CFM air flow to support complete combustion at or under the burning material.

Also, in cases where a batch of poorly combustible trash material is encountered, an extra refuse storage hopper and feed hopper may be employed to feed coal and/or tire chips to the incinerator to insure constant heating of the steam pipe assembly. Moreover, in cases where the trash burns at lower temperatures, it may be advisable to temporarily shut off the sewer sludge and thus a valve may be inserted in the sewage sludge line 4 prior to introduction into the furnace, which valve may be actuated and closed or opened by a temperature sensor (also not shown), present in the furnace. Of course, the whole system may be computerized to insure proper mixture of the tire chips, trash and sewage sludge so as to achieve an optimum temperature. This is achieved by actuating valves and/or dispenser units so as to control the proportions of the sludge, tires and trash fed into the furnace. Thus, in winter months, it may be advisable to use a greater proportion of the tire chips because of its high heat producing capacity to counteract the surrounding cold ambient temperature and/or compensate for trash, which has been wetted by melted snow, etc.

Figure 5:
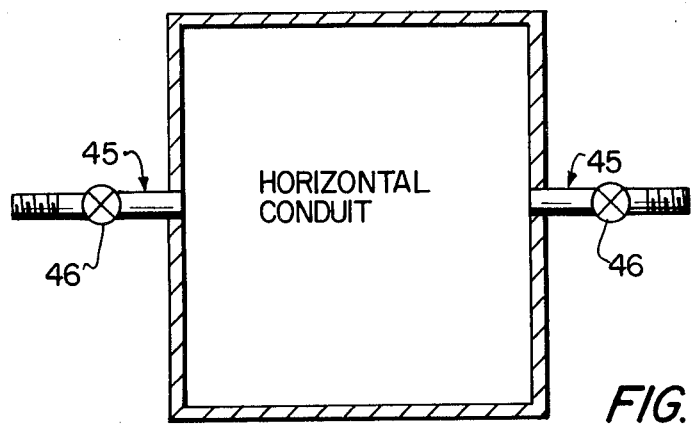
FIG. 5 shows threaded gas exit pipes from the horizontal flue conduit, which pipes are designed to be removably detached to the gas inlets of the fume separators.

In respect to the fume separators, it may be advisable to use a plug-in type arrangement means to plug in the fume separator to the flue tube 19 so that in the event that one of the fume separators gets clogged up, it can be easily removed and cleaned without interrupting the burning operation. To achieve this, any known means can be employed, such as a trap-like spring-loaded door so that the fume separators can be easily inserted into the flue tube and removed therefrom and in which upon removal, the trap-like door is immediately closed. Further, the fume separator may be simply screwed into pipes located along the horizontal conduit 19 by screwing the exhaust inlet means 27 into threaded pipes 45, as shown in FIG. 5, located along the length of said horizontal conduit with valves 46 interposed between the conduit exit pipes of the exhaust gas inlets 27 so that the valves can be shut off when one or more fume separators becomes clogged. This prevents the contaminated gases from entering the atmosphere during the cleaning of the contaminated fume separators.

Although the drawings show a certain number of fume separators located upon the horizontal conduit 19, typically about 200 feet in length, the number of fume separators depends upon the size of the burning operation and the length of the tube. The number of separators and the tube length is, therefore, not significant as long as the fume separators are sufficient in conjuction with the amount of alkaline cleaning solution necessary to clean the exhaust gases so as to meet environmental pollution standards. Further, more than one fume separator may be connected in series in each location to insure even better purification of the gases by connecting the exhaust gas inlets 27 of one fume separator to the exhaust gas inlet of another separator preferably located underneath the first. This is especially significant when the gases are heavily contaminated.

As pointed out previously, forced air and/or oxygen may be introduced at the bottom of the refuse burning furnace 6. Of course, the introduction of pure oxygen greatly enhances the combustion potential of the trash material, since air contains approximately 79% of the inert gas nitrogen.

Pure oxygen can be generated in this system and recycled back to the bottom of the incinerator 6 by utilizing heat from the flue conduit 19 to subject water to electrolysis and separate it into its component parts, i.e., oxygen and hydrogen. In the concrete workings of such a system, a heat exchanger 37 (FIG. 1) is connected to the horizontal conduit 19, or the exhaust flue 16 located before the economizer or at any other convenient place in the heating system, whereby the heat from such exchanger is used to convert a liquid refrigerant, such as helium, to a gas which is then used to propel a turbine connected to a DC generating source in which a DC current is transferred by means of electrodes into an electrolysis tank containing water and an electrolyte, such as salt, wherein oxygen and hydrogen are produced in a conventional manner. The essential apparatus employed in such an electrolysis system is shown in U.S. Pat. Nos. 4,011,148, 4,216,067 and 4,246,060; these patents dealing generally with specific heating means to effect the electrolysis. The heat exchanger, such as a steel bulb, may be tapped into or welded into the exhaust tubing 19 of FIG. 1 so it is in contact with the hot gases (without emitting such corrosive gases to the atmosphere) and this heat exchanger is used to transfer heat to a compressed liquid source, such as helium, e.g., by means of a pipe connected to a helium source which pipe is screwed into the apex of the steel bulb, said apex, of course, being threaded to receive the pipe.

Although the method of producing oxygen and hydrogen by means of a liquid refrigerant source is well known and shown in the aforementioned patents, a schematic diagram of a typical system will be described in FIG. 6.

Figure 6:
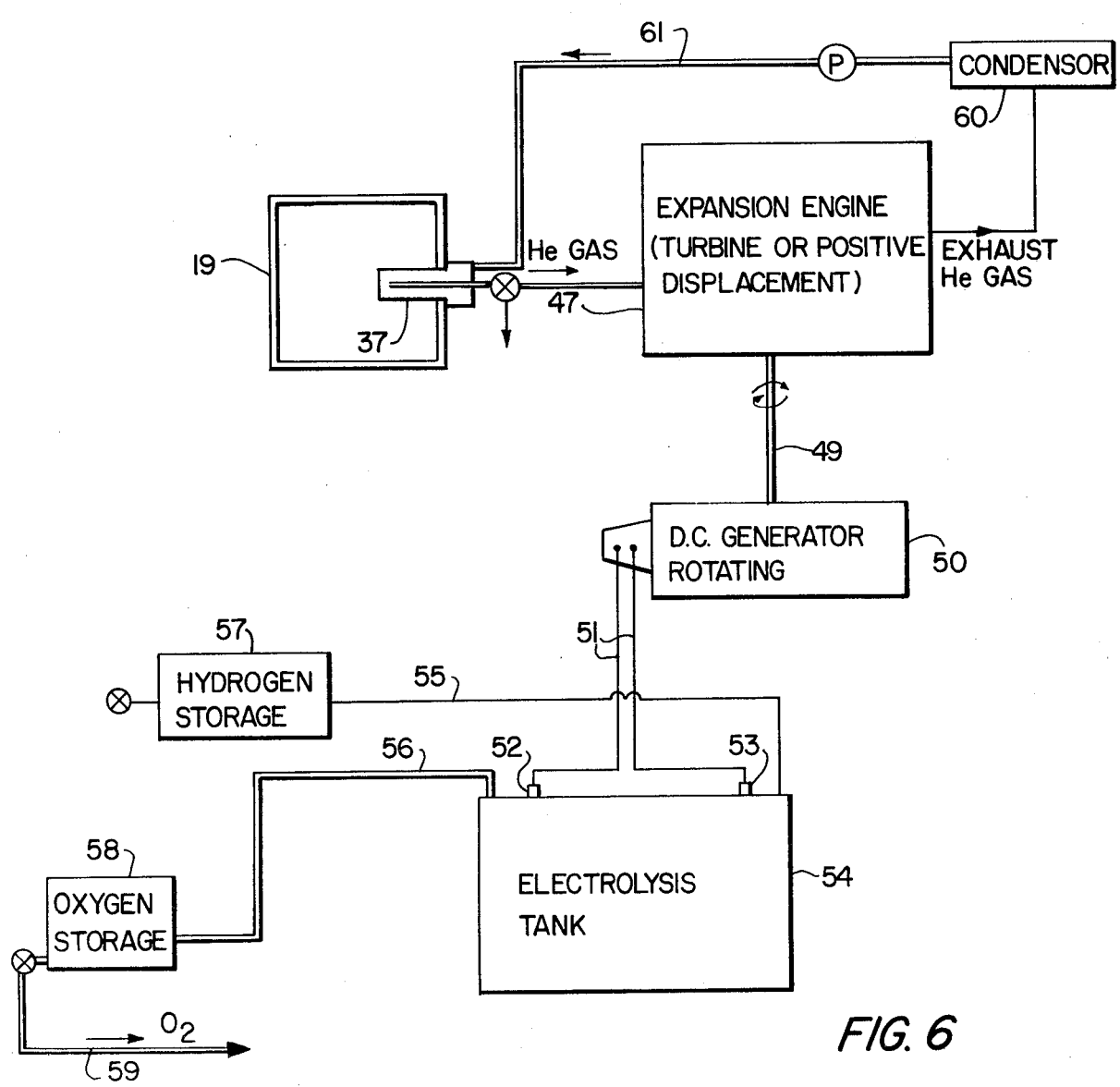
FIG. 6 is a schematic view of an electrolysis apparatus by which oxygen is produced and recycled back to the incinerator for combustion purposes.

In FIG. 6, a heat exchanger 37 or closed steel bulb is welded into the horizontal conduit 19 and a refrigerant source, such as helium, is located within the steel bulb so that the heat from the hot flue gases contacting the exterior of the bulb 37 causes the helium to be converted into a gas (although the helium source may be located outside of the bulb providing the heat from the heat exchanger is used to convert it into a gas). The gas is directed into the expansion engine 47 (e.g., a turbine or a Rankin engine) which in turn in coupled by a shaft 49 to a DC generator 50. Power lines 51 extend into the electrolysis tank through electrodes 52 and 53 where water containing an electrolyte is converted to oxygen and hydrogen. The hydrogen and oxygen is directed through lines 55 and 56 into hydrogen storage tank 57 and oxygen storage tank 58, respectively. The oxygen may be then recycled back to the bottom of the incinerator to improve combustion as previously disclosed. Alternatively, the oxygen storage tank may be dispensed with and the oxygen recycled directly to the incinerator. The exhaust helium gas may be condensed by condensor 60 and pumped or recycled by line 61 back to the helium source.

Other auxiliary sources of heat may be used in addition to the heat tapped from the flue conduit 19 in FIG. 1 to convert the liquid helium into a gas. As can be seen by the drawing, the driving system is a closed cycle fluid refrigerant-type system and the refrigerant may be compressed back into a gas and recycled back to the liquid source. As a preferable means, the liquid refrigerant may be converted to a gas and used to run a Rankin engine connected to an electrical generating source to utlimately convert mechanical into electrical energy, i.e., a DC current to effect the electrolysis operation. The oxygen produced from such electrolysis system is recycled by a pipe (not shown) back to the bottom of the incinerator furnace and the hydrogen gas may be stored in a suitable container for use as a fuel. According to this procedure, Applicants are able to take advantage of the existing heat in the system to produce oxygen gas, which in turn is used to enhance the combustion of the refuse material in the incinerator furnace. This operation serves to greatly conserve energy, which will help to make the country self-sufficient in respect to energy sources. Of course, more than one heat exchanger may be located in the incinerating system, such as along the horizontal conduit 19.

Certain other advantages exist in Applicants' system. The contaminated exhaust gases are at a temperature of approximately 350° F. to 500° F. by the time they reach the fume separators, which maximizes the possibility of reacting quickly with the alkaline material to reduce the acidic components in the gas at such increased temperatures. Also, by the time the gases are exhausted into the atmosphere, they are ultimately cooled down to a temperature of approximately 100° F. or less.

It should be emphasized that other features can be incorporated into Applicant's apparatus or process. Thus, the water may be purified by electro-magnetic or other means prior to entrance into the system either for cooling or generating steam so as to minimize the amount of corrosion into the system. Also, means can be provided for changing the size of the grates in the incinerator when smaller particles, such as coal, are to be burned by either supplying means to modify the size of the existing grates or to exchange them with a smaller grate system by, for example, locating means at the bottom of the furnace, such as a door, to replace the grates, when necessary. Also, valves can be introduced into the system and automatically controlled to achieve constant boiling pressure and heat release compensation means can similarly be provided so as to maintain constant furnace pressure.

The incinerator and fume separator of the present invention is designed to burn anywhere from 50 to 1,000 tons or more of trash daily with a 15% or more mix of tire chips to give a burn temperature up to approximately 1800° F. Such a system can be used to supply steam heat to public buildings, hospitals, nursing homes and supported housing projects at the rate of 20,000 to approximately 500,000 pounds of steam per hour and serve populations in towns and cities of 25,000 to 100,000 people. In the summer time, the system is used to drive a steam generator or a Rankin Engine to ultimately produce electrical power to use in supplying air conditioning to these establishments. The system is also designed to handle at least 200 tons per day of sewer sludge and to dehydrate it to approximately 40% $H_2O$ and burn this end product to produce a sterile ash as pointed out previously. Moreover, such plastics containing large amounts of hydrochloric acid, which have been heretofore extremly difficult to remove, can be effectively removed by the system of the present invention to satisfy E.P.A. standards into the 1990's by the existing laws and improve every community's future need for proper landfill management. The present apparatus and system, therefore, represent no small advance in the field.

Finally, it must be emphasized that while the specific embodiments are illustrative of the practice of the invention, other expedients known to those skilled in the art may be employed to carry out Applicants' essential inventive concept without departing from the spirit of the invention or the scope of the claim.

What is claimed:

1. A process for producing the steam to heat establishments or to generate electricity by incinerating combustible materials such as trash, sewage, tire chips or coal and mixtures thereof in a furnace, while purifying the acidic exhaust gases produced from the combustion of such materials, comprising feeding the combustible materials into a furnace wherein said materials are burned at temperatures up to about 1800° F.; passing the gaseous products of combustion from such burning operation as contaminated exhaust gases over water-containing boiler tubes located within the furnace for generating steam from such boiler tubes to be tapped off for heat or electricity generating purposes; passing the contaminated exhaust gases through a water-cooled economizer; directing the exhaust gases through a water-cooled horizontal conduit closed at the downstream end thereof wherein the gas is passed through a series of baffles and fly ash settling chambers, whereby the larger particulate waste materials in the exhaust gases are preliminarily removed; passing the contaminated exhaust gases along said water-cooled horizontal conduit and through a plurality of acid and alkaline resistant fume separators spaced along the length of the conduit and having inlets connected to the conduit, whereby the acidic exhaust gases are introduced into the fume separators through said inlets at high velocity and are mixed with an alkaline liquid introduced into said separators from an alkaline source to neutralize any acidic materials and to remove any smaller particles which may remain in the exhaust gases; each of said fume separators being composed of a container, a gas exhaust inlet, a rotary shaft centrally disposed within said container and means to rotate said shaft, a ribbed slinger attached to the upper portion of the shaft and having a bowl-shaped solid disc with ribbed portions located within and protruding upwardly from the interior of the disc with a rotary shaft extending approximately through the center of the disc and the outer periphery of the disc in close proximity to the interior of the container, a centrifugal fan having the blades curved in the direction opposite to the direction of the rotation of the fan, said fan being attached to the lower portion of the shaft below the ribbed slinger, a conical open ended device connected to the walls of the fume separator means, which device is located underneath the ribbed slinger with the smaller end of the cone directed towards the center of the fan so as to funnel the contaminated exhaust gas-alkaline liquid mixture into the center of the fan, liquid baffle means around said fan, a drain at the bottom of said fume separator below said baffle means and having a drain exit therein, and a central opening in the bottom of said container to emit the purified exhaust gas, said fume separator forming three distinct gas purification zones when the shaft is rotating at high velocity in which the contaminated exhaust gases are successively treated and purified in the following zones:

(A) a contact zone in which the exhaust gas is introduced at the gas inlet and propelled downward in a cylonic flow due to the relative movements of the ribbed slinger and centrifugal fan and wherein the exhaust gas is intimately mixed with an alkaline liquid introduced into the fume separator such that it contacts the ribbed slinger disc located below the exhaust gas inlet, whereby the liquid is broken up into fine droplets by the propelling and shearing action of the rotating ribbed slinger as the shaft is rotated; said slinger propelling the liquid perpendicular to the cyclonic downward flow of the exhaust gases so as to increase the contact time and insure intimate contact between the alkaline liquid and the contaminated exhaust gases;

(B) a venturi zone located underneath the ribbed sligner caused by the downward pull of the gas by the centrifugal fan, said gas passing between the periphery of the spinning slinger and the interior walls of the container where it is funneled into a conical shaped container underneath the ribbed slinger to form a venturi turbulent zone due to the increased velocity of the gas, thereby insuring even more complete contact between the tiny droplets of solution and exhaust gases; and (C) a final separation zone wherein the alkaline liquid and contaminated gaseous mixture are directed from the conical shaped device into the center of the centrifugal fan located underneath the ribbed slinger, whereby the movement of the centrifugal fan drives the exhaust gas from the center of the fan through the blades forcing the remaining contaminants in the exhaust gas to be captured and neutralized by the alkaline liquid and directing the liquid against the baffle means and onto the wall of the fume separator container to separate the liquid from said mixture, which liquid is collected in a drain trough located beneath said baffle means and removed through the drain exit and wherein the purified gases are passed out of the separator through the central opening in the bottom of the fume separator.

2. A process according to claim 1 wherein the combustible material is a mixture of trash, tire chips, and sewage sludge.

3. A process according to claim 2 in which the tire chips are present in an amount of at least 15% by weight.

4. A process according to claim 2 in which the combustible material consists essentially of about 84% trash, 15% tire chips, and 1% sewage sludge.

5. A process according to claim 1 in which the combustible material is municipal waste and wherein the said waste is introduced into the furnace by means of a water-cooled hopper to prevent pre-melting of the waste material in the hopper as a result of heat transfer from the furnace.

6. A process according to claim 5 which comprises propelling the waste material through the lower portion of the water-cooled hopper, where clogging is apt to occur by means of an auger.

7. A process according to claim 1 in which the entire furnace is made of a double-walled construction and is water-cooled by passing water between the walls of such double-walled construction.

8. A process according to claim 1 which further comprises cooling the horizontal conduit containing the fume separators by water-cooling so that the exhaust gases entering the fume separators are cooled to a temperature approximately between 350° F. and 500° F.

9. A process according to claim 1 in which the furnace contains moveable grates at the bottom thereof where incineration takes place, said process further comprises blowing air, oxygen or mixtures thereof in the bottom of said furnace and onto the bottom of the grates to insure complete combustion of the combustible waste materials.

10. A process according to claim 9 in which substantially pure oxygen is introduced at the lower portion of the furnace, said oxygen being produced by the electrolysis of water being effected by a heat exchange means by which heat from the exhaust system is transferred to a liquid refrigerant source to convert said liquid refrigerant to a gas, whereby the gas is used to propel a turbine connected to a DC generating source to provide power to positive and negative electrodes submerged in an electrolysis tank containing water and an electrolyte therein, whereby oxygen is produced at one electrode and hydrogen at the other, said oxygen being circulated to the lower portion of the furnace to insure complete combustion of the waster material.

11. A process according to claim 1 in which the contaminated exhaust gases are passed through fume separators alternately located on opposite sides of the horizontal conduit to insure uniform purification of the exhaust gases.

12. A process according to claim 1 further comprising directing the purified exhaust gases leaving the fume separator into at least one air discharge duct and directing it into an exhaust gas to the atmosphere.

13. A process according to claim 11 which comprises directing the purified exhaust gases leaving the fume separators to two air discharge ducts located on opposite sides of the horizontal conduit whereby the purified gases are pulled by at least one induction fan into an exhaust stack and into the atmosphere.

14. A process according to claim 1 in which the contaminated exhaust gases are directed to at least two fume separators located along the horizontal conduit connected in series at each location along the conduit and by which the exhaust gases exiting from one fume separator are directed to the inlet of another fume separator located downstream and approximately underneath the first separator, whereby the gases are intimately mixed with more alkaline solution to insure substantially complete removal of any acidic materials or fumes in the gases in cases where the exhaust gases are heavily contaminated with impurities.

15. A process according to claim 1 further comprising passing the alkaline liquid from the fume separators through at least one filter medium where any remaining particulates are removed, and then recycling the filtered alkaline liquid back to the alkaline source.

16. A process according to claim 1 further comprising analyzing the composition of the gas after is is purified in the fume separators and controlling the amount of alkaline liquid introduced into said fume separators in response to the acidity of the fumes detected in the exhaust gases leaving the fume separators.

17. A steam generating furnace in which the steam is primarily generated by municipal refuse comprising: a water-cooled feed hopper; a refuse burning furnace to which said feed hopper is connected for feeding refuse into said furnace, said furnace containing refractory bricks on the interior thereof and having a double-walled construction for permitting water to be passed through the double walls as a heat exchange medium; a moveable grate located at the lower portion of the furnace on which the combustible material is incinerated; means for blowing air or oxygen in at the bottom of the furnace underneath said moveable grate to enhance combustion; a sewer sludge conduit located at the upper portion of the furnace by which sludge may be introduced; an ash pit located below said moveable grate and means to remove ashes therefrom; an exhaust flue opening out of the top of said furnace; boiler tubes located within the interior of the furnace and said exhaust flue through which water can be circulated for converting the water to steam; a steam exit tube connected to said boiler tubes to convey the steam generated from said boiler tubes to heat establishments and/or generate electricity; a water-cooled economizer in said exhaust flue downstream of the boiler tubes by which contaminated and acidic exhaust gases are cooled and larger particulate materials contained therein are separated; a horizontal conduit connected to the outlet end of said economizer, said horizontal conduit containing baffles, and fly ash chambers at the entrance for further removing particulate materials from the exhaust gases; a plurality of acid and alkaline resistant fume separator means for purifying the exhaust gases spaced at relatively close intervals along the conduit and having inlets removably connected to said conduit and outlets for discharging the gases, said conduit being closed at the downstream end thereof; at least one discharge duct connected to the outlets of said fume separator means; an exhaust stack connected to the discharge duct and at least one induction fan between said fume separator means outlets and the exhaust stack to pull the clean gases through the discharge duct and discharge it into the atmosphere through the stack; said fume separator means each comprising a container having a rotating shaft approximately centrally disposed therein; a ribbed slinger connected to the upper portion of the shaft and a centrifugal fan on said shaft underneath the ribbed slinger, said ribbed slinger consisting of a solid bowl-shaped disc containing ribbed sections located within the interior of the bowl, and said centrifugal fan containing blades curved in the direction opposite to the direction of rotation of the fan; means connected to said shaft to rotate the shaft at a high rotational velocity; a gas inlet pipe located at the upper portion of the fume separator above the ribbed slinger, which pipe is connected to the horizontal conduit for intake of the contaminated flue gases; a liquid inlet pipe located below the exhaust gas inlet for supplying an alkaline liquid to said ribbed slinger; an alkaline liquid supply source to which said liquid inlet pipe is connected; a cone-shaped device connected to the walls of the fume separator means, which device is located underneath the ribber slinger and having the smaller side of the cone directed towards the center of the centrifugal fan to funnel the exhaust gases and alkaline liquid into the center of the fan; baffle means around said fan for removing liquid from the exhaust gas as the liquid-gaseous mixture is sprayed into the baffle when the fan is rotated; liquid drain means located underneath the baffle for removing the separated liquid from the bottom of the fume separator; means to recycle the collected liquid back to the said alkaline liquid supply source; and a gas exit tube opening out of the bottom of said container and connected to said discharge duct, whereby when the shaft rotates at high speed, the rapid movement of the ribbed slinger and the backward curved fan blades produce a fine spray of the alkaline liquid droplets so that intimate mixing between the exhaust gases and fine alkaline liquid droplets is effected and also said relative movements of the ribbed slinger and backward curved fan blades produce a cyclonic downward flow of the liquid-gas mixture, whereby any acidic materials or fumes in the gases are neutralized and any small particulate materials which may be present therein are removed.

18. An apparatus according to claim 17 in which the plurality of fume separator means are located alternately on both sides of the horizontal conduit so as to insure more effective removal of the contaminants in the exhaust gases.

19. An apparatus according to claim 17 in which each fume separator means comprises a plurality of fume separators connected in series at each location along the flue conduit such that the gas exit tube from the upstream fume separator is connected to the gas inlet pipe of the downstream fume separator, said separators being located approximately one below the other, and wherein the gas exit tube of the last fume separator is connected to said discharge duct.

20. An apparatus according to claim 17 in which said recycling means includes filter means.

21. An apparatus according to claim 17 further comprising a gas analyzer probe in said exhaust stack and means connected to said liquid inlet pipe to control the amount of alkaline liquid entering the fume separators and connected to said gas analyzer probe to carry out said control in response to said gas analyzer probe.

22. An apparatus according to claim 17 in which the fume separators are constructed such that the free flowing gas inlet located at the upper portion of the fume separator can be removably detached to the horizontal conduit in openings located along the conduit and which openings are such that the fume separators can be individually connected and removed without permitting the contaminated exhaust gases to contaminate the atmosphere.

23. An apparatus according to claim 17 in which the horizontal conduit is made of stainless steel.

24. An apparatus according to claim 17 in which the fume separators are made of stainless steel coated on the entire insides thereof with an alkali-resistant resin.

25. An apparatus according to claim 24 in which the alkali-resistant resin is an epoxy resin.

26. An exhaust purifying apparatus to be attached to a steam generating furnace primarily heated by municipal refuse and containing an economizer for cooling the acidic exhaust gases and removing large particulates from the exhaust gases, said exhaust purifying apparatus consisting essentially of a flue conduit designed to be connected horizontally to the exhaust gas outlet of the economizer; a plurality of steel baffles and fly ash chambers to remove ash particles located in said conduit; a plurality of acid and alkaline resistant fume separator means for purifying the exhaust gases, said purifier means having inlets connected to said conduit and outlets for discharging the purified gases said conduit being closed at the downstream end of the conduit, said fume separator means each comprising a container having a rotating shaft approximately centrally disposed therein; a ribbed slinger connected to the upper portion of the shaft, and a centrifugal fan on said shaft underneath the ribbed slinger, said ribbed slinger consisting of a solid bowl-shaped disc containing ribbed sections located within and protruding from the interior thereof, said disc extending in close proximity to the interior walls of the container, said centrifugal fan located underneath and spaced from the ribbed slinger, said fan having blades curved in the opposite direction of the rotation of the fan; means to rotate the shaft at high velocity; a gas inlet pipe located approximately at the top of the fume separator container and connected to the horizontal conduit to permit intake of the contaminated flue gases into the fume separator; a liquid inlet pipe located below the exhaust gas inlet connected to an alkaline liquid source for supplying an alkaline liquid to said ribbed slinger; a conical shaped device connected to the walls of the container and located underneath the ribbed slinger, said conical device having the smaller end of the cone directed towards the center of the centrifugal fan to funnel the exhaust gases and alkaline liquid into the center of the fan; baffle means around said fan for removing liquid from the exhaust gas; liquid drain means for collecting liquid for the baffle means and to remove it from the fume separator; means to recycle the collected liquid back to the said alkaline supply source; and a gas exit tube opening at the bottom of said container whereby the purified gases are exhausted into the atmosphere; said fume separators operating in such a manner that as the shaft rotates at high speed, the rapid movement of the ribbed slinger and the backward curved fan blades produce a fine spray of the alkaline liquid droplets so that intimate mixing between the exhaust gases and fine alkaline liquid droplets is effected and also said relative movements of the ribbed slinger and back curved fan blades produce a cyclonic downward flow of the liquid-gas mixture, whereby any acidic materials or fumes in the gases are neutralized and any small particulate materials which may be present therein are removed.

27. An apparatus according to claim 26 in which the plurality of fume separator means are located alternately on both sides of the horizontal conduit so as to insure more effective removal of the contaminants in the exhaust gases.

28. An apparatus according to claim 26 in which each separator means comprises a plurality of fume separators connected in series at each location along the flue conduit, the gas exit tube from the upstream fume separator being connected to the gas inlet of the downstream second fume separator and the separators being located approximately one below the other.

29. An apparatus according to claim 26 in which said recycling means includes filter means.

30. An apparatus according to claim 26 in which the fume separators are constructed such that the gas inlet located at the upper portion of the fume separator can be removably detached to the horizontal conduit in openings located along the conduit and which openings are such that the fume separators can be individually connected and removed without permitting the contaminated exhaust gases to contaminate the atmosphere.

31. An apparatus according to claim 26 in which the horizontal conduit is made of stainless steel.

32. An apparatus according to claim 26 in which the fume separators are made of stainless steel coated on the entire insides thereof with an alkali-resistant resin.

33. An apparatus according to claim 32 in which the alkali-resistant resin is an epoxy resin.

* * * * *